(12) United States Patent
Nakamura et al.

(10) Patent No.: US 6,390,867 B2
(45) Date of Patent: May 21, 2002

(54) TILT DEVICE FOR MARINE PROPULSION UNIT

(75) Inventors: Tamotsu Nakamura; Shinsuke Sekikawa, both of Saitama (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/793,258

(22) Filed: Feb. 26, 2001

(30) Foreign Application Priority Data

Jun. 23, 2000 (JP) ........................................ 2000-190114

(51) Int. Cl.[7] ............................................... B63H 5/125

(52) U.S. Cl. .......................................................... 440/61

(58) Field of Search ............................. 441/53, 57, 61, 441/900

(56) References Cited

U.S. PATENT DOCUMENTS 5,876,259 A * 3/1999 Nakamura .................... 440/61
6,039,617 A * 3/2000 Nakamura .................... 440/61

FOREIGN PATENT DOCUMENTS

JP 2945071 6/1999
JP P2000255490 A 9/2000

* cited by examiner

Primary Examiner—Stephen Avila
(74) Attorney, Agent, or Firm—Orum & Roth

(57) ABSTRACT

In a tilt device for a marine propulsion unit, a cylinder is constituted by a double pipe having an outer cylinder and an inner cylinder, a piston rod and a piston are received in the inner cylinder, a pressure accumulating chamber is formed between the outer cylinder and the inner cylinder, and a free piston (gas-liquid separating means) is arranged between the pressure accumulating chamber and the piston side chamber.

8 Claims, 11 Drawing Sheets

TILT DEVICE FOR MARINE PROPULSION UNIT

BACKGROUND OF THE INVENTION

1. Field of the Invention

The present invention relates to a tilt device for a marine propulsion unit.

2. Description of the Related Art

There is a structure described in Japanese Patent No. 2945071 as a tilt device having a gas assist function for assisting a tilt up load applied to a main body of a propulsion unit by a gas pressure in a pressure accumulating chamber.

The tilt device is a single cylinder inverted type in which a piston rod protrudes to the lower side of a cylinder. A piston is fixed to the piston rod inserted to the cylinder, and a free piston for coinciding a returning position after the main body of the propulsion unit rises up due to collision of drifting wood with a staying position before rising up is provided along the piston. A switching valve for communicating a rod side chamber within the cylinder defined by the piston and the free piston with a piston side chamber and an operating portion thereof are provided in a side portion of the cylinder. Further, a pressure accumulating chamber for applying gas pressure for a gas assist to the piston side chamber is arranged within the cylinder and on the piston side chamber. Accordingly, gas pressure in the pressure accumulating chamber is applied to both sides of the piston via a working fluid when opening the switching valve, and The gas assist force corresponding to the cross sectional area of the rod can be generated in a tilting up direction.

(1) The tilt device described in Japanese Patent No. 2945071 is structured such that the pressure accumulating chamber is arranged on the piston side chamber without a gas-liquid separating means such as a partition or the like therebetween. The gas in the pressure accumulating chamber immediately moves to the rod side chamber from the piston side chamber when the switching valve opens for use. The erect type tilt device in which the protruding direction of the piston rod from the cylinder is directed to an upper side, will not allow the gas assisting function to be achieved. Accordingly, the tilt device can be mounted only in the inverted direction, and there is no freedom of the mounting direction.

(2) Since the pressure accumulating chamber is within the single cylinder type cylinder and on the piston side chamber in a recessed side of the closed end of the cylinder, it is hard to increase the capacity of the pressure accumulating chamber.

(3) Since the switching valve and the operating portion thereof are within the side portion of the cylinder, the lateral size of the tilt device becomes too large.

In Japanese Patent Application No. 11-64054, the tilt device filed by the applicant of the present invention is a plural cylinder erect type in which a piston rod protrudes to the upper side of a cylinder. The cylinder has a double pipe structure with an outer cylinder and an inner cylinder, and a pressure accumulating chamber formed between the outer cylinder and the inner cylinder. The pressure accumulating chamber communicates with a piston side chamber defined in an inner portion of the inner cylinder and below the piston so as to provide a gas assisting function. However, in this structure, since the gas-liquid separating means such as a partition or the like is not provided between the pressure accumulating chamber and the piston side chamber, the gas moves to the rod side chamber disposed above the piston after passing through the switching valve and stays in the rod side chamber when the gas in the pressure accumulating chamber is caught up in the piston side chamber due to a wave rock of the hull or the like. Therefore the gas assist is deteriorated due to the gas pressure in the pressure accumulating chamber or the tilt lock is deteriorated because the piston is accidentally moved at a time when the switching valve is closed. This state is due to existence of the working fluid constituted by mixing the gas in both side chambers of the piston.

SUMMARY OF THE INVENTION

An object of the present invention is to provide a tilt device for a marine propulsion unit with a gas assist function which can increase the capacity of a pressure accumulating chamber while being compact and can secure an improved operability while maintaining freedom in the mounting direction.

In accordance with the present invention, there is provided a tilt device for a marine propulsion unit having a cylinder connected to one of a hull and a main body of a propulsion unit which receives a working fluid. A piston rod is connected to another and is inserted into the cylinder so as to freely compress and expand. A piston is connected to an inserted end of the cylinder of the piston rod and which defines a rod side chamber in a piston rod receiving side and a piston side chamber in a piston rod not receiving side within the cylinder. A switching valve is capable of communicating the rod side chamber with the piston side chambers, a pressure accumulating chamber is capable of applying a gas pressure to the piston side chamber.

The cylinder is constituted by a double pipe with an outer cylinder and an inner cylinder, the piston rod and the piston are received in the inner cylinder, the pressure accumulating chamber is formed in a space between the outer cylinder and the inner cylinder, and gas-liquid separating means is arranged between the pressure accumulating chamber and the piston side chamber.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS (First Embodiment) (FIGS. 1 to 8)

Figure 1:
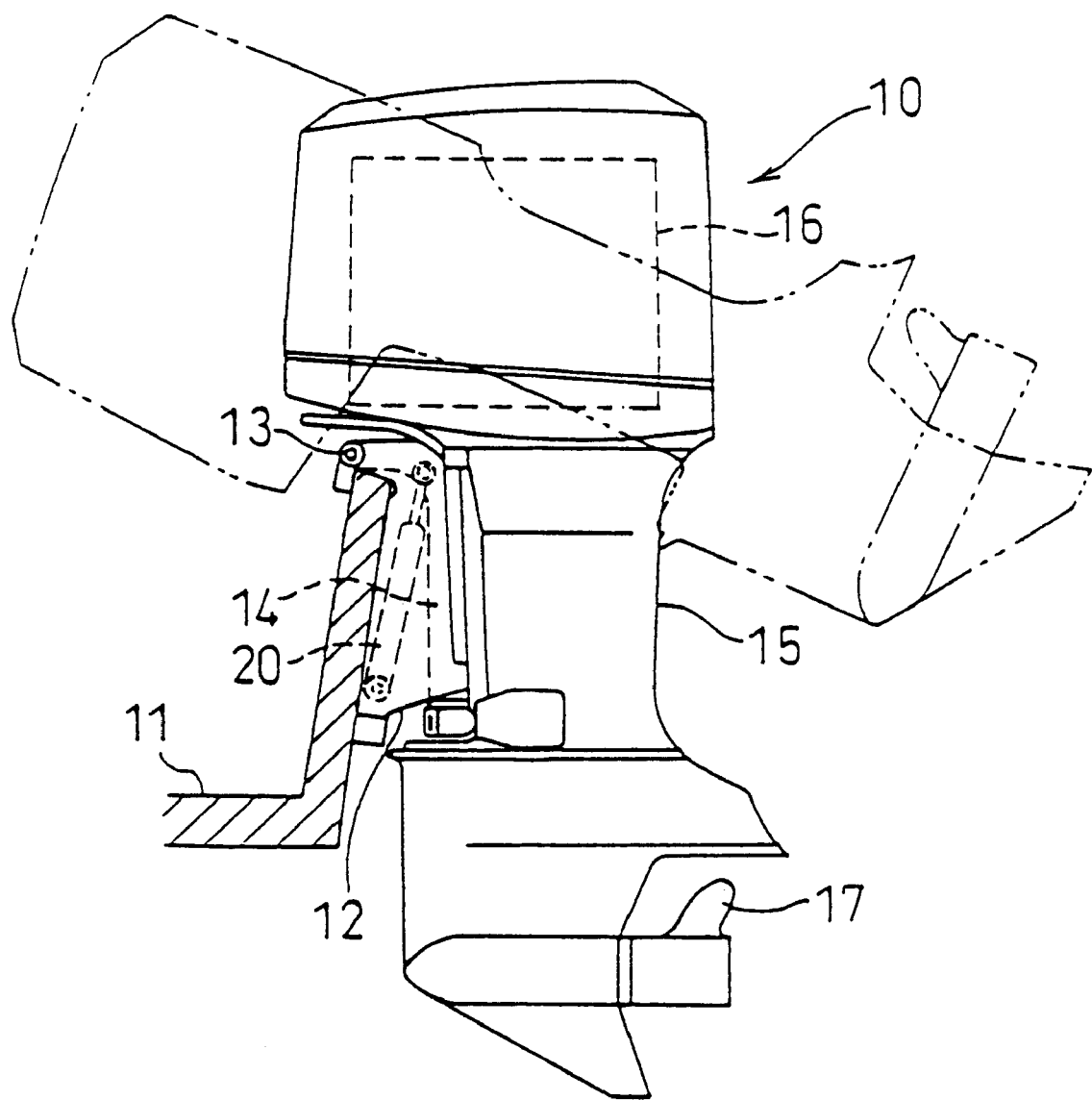
FIG. 1 is a schematic view showing a marine propulsion unit.
Figure 2:
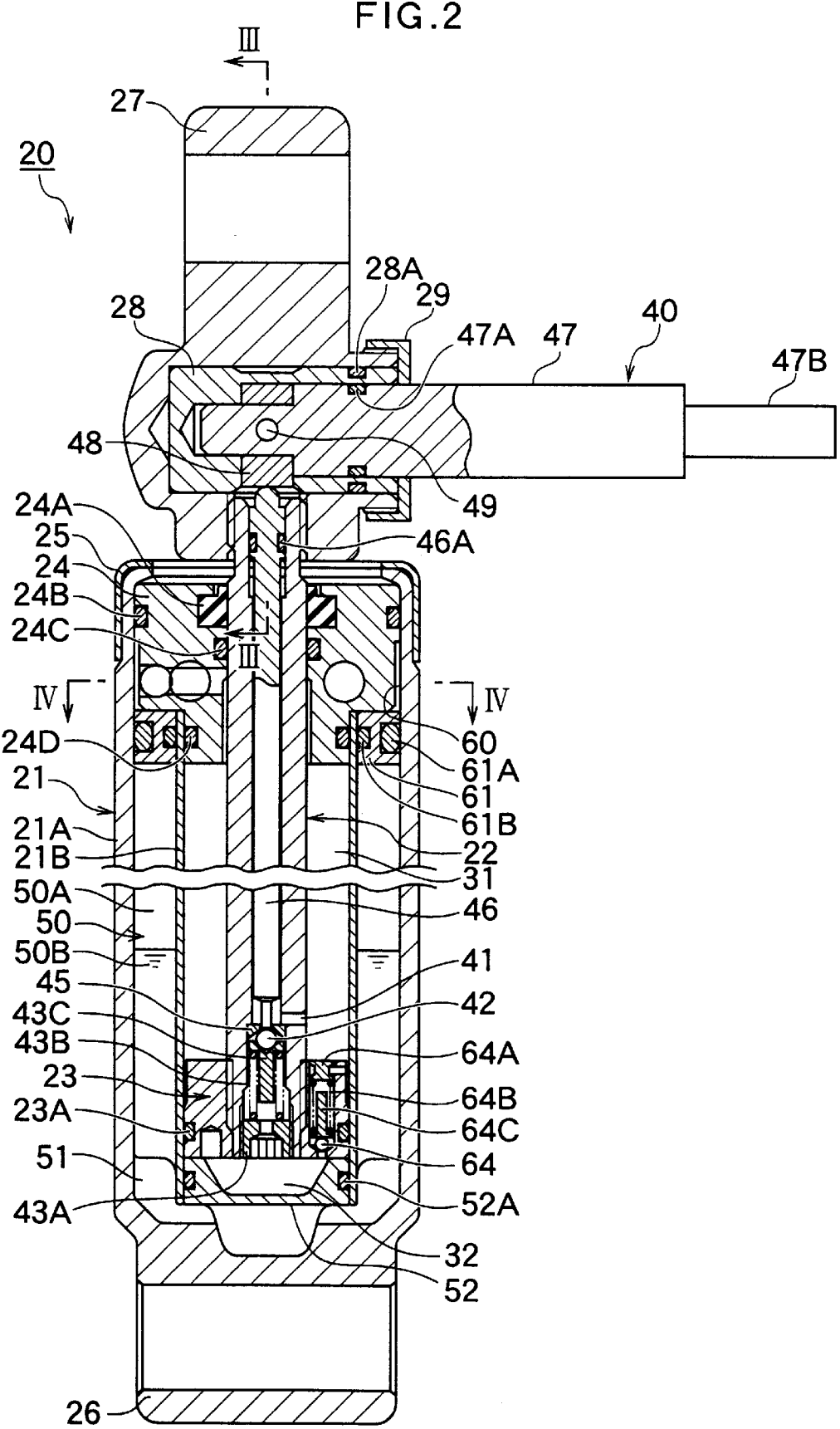
FIG. 2 is a cross sectional view of a main portion showing a tilt device in accordance with a first embodiment.

A marine propulsion unit 10 is, for example, an outboard motor (or an inboard outboard motor) mounted to a hull 11, as shown in FIG. 1, and is structured such that a clamp bracket 12 is fixed to the hull 11 and a swivel bracket 14 is pivoted to the clamp bracket 12 via a tilt shaft 13. A propulsion unit main body 15 of the marine propulsion unit 10 is pivoted to the swivel bracket 14 via a steering shaft (not shown). An engine unit 16 is mounted on the upper portion of the propulsion unit main body 15 and a propeller 17 is provided in a lower portion of the propulsion unit main body 15. The marine propulsion unit 10 is held down by a tilt device 20 mentioned below, and normally or reverse rotates the propeller 17 in accordance with an operation of the engine unit 16 so as to move the hull 11 forward or rearward.

The tilt device 20 is structured, as shown in FIGS. 2 to 8, such that a mounting portion 26 present in the cylinder 21 is connected by a pin to one of the clamp bracket 12 and the swivel bracket 14; to the clamp bracket 12 in the present embodiment. A mounting portion 27 is screwed and attached to a piston rod 22 inserted to the cylinder 21 so as to freely expand and compress. The mounting portion 27 is connected by a pin to another of the clamp bracket 12 and the swivel bracket 14; to the swivel bracket 14 in the present embodiment. And a piston 23 is fixed to an inserted end of the cylinder 21 of the piston rod 22. The cylinder 21 is constituted by a double pipe structure (a complex cylinder structure) with an outer cylinder 21A and an inner cylinder 21B. The cylinder 21 is structured such that the outer cylinder 21A and the inner cylinder 21B are sealed at an end portion of the cylinder 21 and a rod guide 24 for supporting the piston rod 22 is provided. That is, the structure is made such that the inner cylinder 21B and the rod guide 24 are held in an inner portion of the outer cylinder 21A by abutting one end portion of the inner cylinder 21B to a recess portion in a closed end of the casting outer cylinder 21A. Another end of the inner cylinder 21B is fitted to a small diameter portion at an inner end of the rod guide 24 fitted to an opening portion of the outer cylinder 21A, and caulking and holding the rod guide 24 by an outer end portion of the outer cylinder 21A. Reference numeral 24A denotes an oil seal, and reference numerals 24B to 24D denote an O-ring. Reference numeral 25 denotes a cap.

The piston rod 22 and the piston 23 are received within the inner cylinder 21B of the cylinder 21. The piston 23 defines a rod side chamber 31 in a side which receives the piston rod 22 and a piston side chamber 32 in a side which does not receive the piston rod 22 in an inner portion of the inner cylinder 21B. The rod side chamber 31 and the piston side chamber 32 receive an oil as a working fluid. Reference numeral 23A denotes an O-ring.

Figure 3:
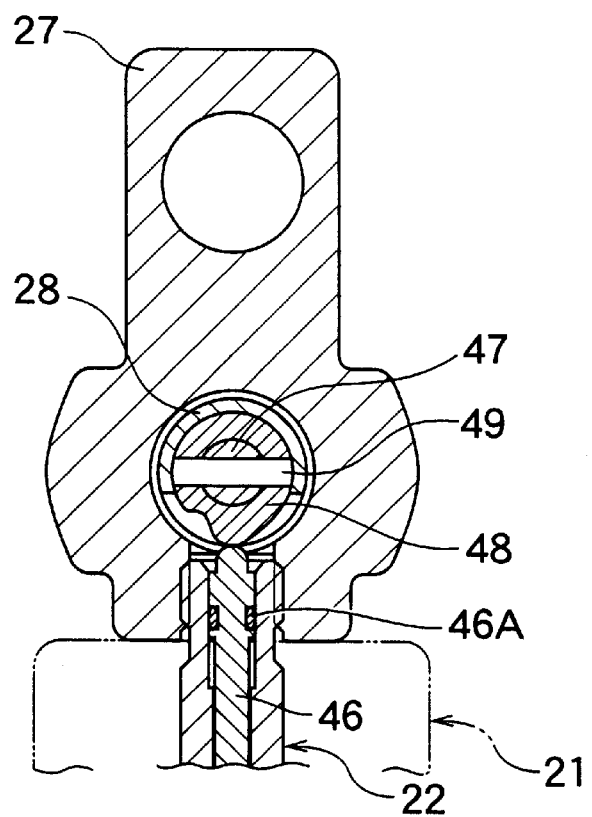
FIG. 3 is a cross sectional view along a line III—III in FIG. 2.
Figure 4:
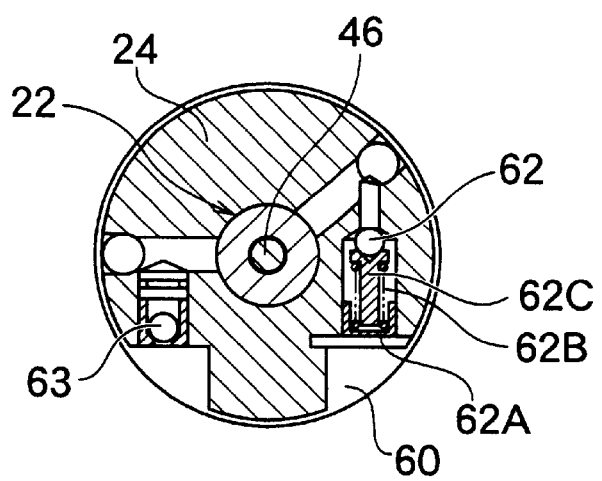
FIG. 4 is a cross sectional view along a line IV—IV in FIG. 2.

The tilt device 20 has a tilt operating apparatus 40 which makes it possible to tilt the propulsion unit 15 between a tilt down position and a tilt up position in accordance with a manual operation. The tilt operating apparatus 40 pierces a communicating passage 41 for communicating the piston side chamber 32 with the rod side chamber 31 in the inserting end side to the inner cylinder 21B of the piston rod 22, and has a switching valve 42 in the communicating passage 41. The switching valve 42 is pressed to a valve seat 45 disposed in the middle of the communicating passage 41 by a spring 43B backed up by a spring bearing 43A attached to an opening of the communicating passage 41 in the side of the piston side chamber 32, and a spring holder 43C so as to close the communicating passage 41. A switching operation rod 46 is inserted to a center portion of the piston rod 22 from an external portion so as to be installed therein. The front end small diameter portion of the switching operation rod 46 abuts the switching valve 42, and a base end portion of the switching operation rod 46 abuts a cam 48 of an operating portion 47 provided in a bearing portion 28 mounted to the mounting portion 27 attached to a portion protruding outward from the cylinder 21 of the piston rod 22 (FIG. 3). Reference numeral 29 denotes a cap, reference numeral 28A denotes an O-ring, reference numerals 46A and 47A denote an O-ring, and reference numeral 49 denotes a connecting pin. That is, the switching operation rod 46 is switched and set to a closing operation position (an upper end position) of the communicating passage 41 by the switching valve 42 and an opening operation position (a lower end position) by rotating the cam 48 of the operating portion 47 by means of a handle engaged and attached to a handle engaging portion 47B of the operating portion 47, thereby opening and closing the switching valve 42 against an elastic force of the spring 43B.

The tilt device 20 has a pressure accumulating chamber 50 capable of applying gas pressure to the piston side chamber 32, for the purpose of assisting a tilt-up load applied to the propulsion unit main body 15 at a time of communicating the rod side chamber 31 with the piston side chamber 32. This occurs in accordance with an opening operation of the switching valve 42 of the tilt operating apparatus 40 so as to manually tilt the propulsion unit main body 15. In the present embodiment, an annular space between the outer cylinder 21A, the inner cylinder 21B and a bottom side space of the inner cylinder 21B communicates with the annular space by a communicating passage 51 form a series of pressure accumulating chamber 50 in the inner portion of the cylinder 21. A free piston 52 constituting gas-liquid separating means is arranged between the pressure accumulating chamber 50 and the piston side chamber 32 in the inner portion of the inner cylinder 21B. Reference numeral 52A denotes an O-ring. The pressure accumulating chamber 50 may be wholly formed as a gas chamber 50A, however, in accordance with the present embodiment, the structure is made such that an oil chamber 50B is provided in a lower portion of the gas chamber 50A and the whole of the gas chamber 50A and the oil chamber 50B constitutes the pressure accumulating chamber 50. The pressure accumulating chamber 50 applies a gas pressure generated in the gas chamber 50A when opening the switching valve 42 of the tilt operating apparatus 40 to both sides of the piston 23 via the working fluid. This reduces the tilt-up load by an assist force obtained by multiplying a cross sectional area of the piston rod 22 by the gas pressure, the cross sectional area corresponding to a difference between both side pressure receiving areas of the piston 23. Further, the pressure accumulating chamber 50 compensates a capacity change of the rod side chamber 31 and the piston side chamber 32 due to the forward and rearward movements of the piston rod 22 with respect to the rod side chamber 31 and the piston side chamber 32 of the cylinder 21, on the basis of expansion and compression of the gas chamber 50A (upward and downward movements of the free piston 52).

The tilt device 20 has the following structure in order to secure a rising up performance of the propulsion unit main body 15 due to collision with an obstacle such as drifting wood or the like. In accordance with the present embodiment, the structure is made such that a free piston 61 is arranged in an annular space between the outer cylinder 21A and the inner cylinder 21B of the cylinder 21. An opposite side of the rod guide 24 with respect to the free piston 61 in the annular space forms the pressure accumulating chamber 50, and a side of the rod guide 24 forms a liquid discharging chamber 60. Reference numerals 61A and 61B denote an O-ring. Further, rod guide 24 (FIG. 4) contains an absorber valve 62 (a spring bearing 62A, a spring 62B and a spring holder 62C) and a return valve 63.

The absorber valve 62 can be opened when the oil in the rod side chamber 31 is increased to a level equal to or more than a predetermined value such as under application of an impact force generated by collision with an obstacle such as drifting wood or the like. The absorber valve 62 can feed the oil in the rod side chamber 31 to the liquid discharging chamber 60, and can extend the piston rod 22 and the piston 23 so as to raise propulsion unit main body 15 up. The return valve 63 can be opened when the oil in the liquid discharging chamber 60 is increased to a level equal to or more than a predetermined value via the piston side chamber 32. The pressure accumulating chamber 50 under application of an empty weight of the propulsion unit main body 15 is tilted up after absorbing the impact force generated by the collision with the obstacle, and can return the oil in the liquid discharging chamber 60 to the rod side chamber 31, and can compress the piston rod 22 and the piston 23 so as to return the propulsion unit main body 15 to a position before rising up. The free piston 61 is brought into contact with the end surface of the rod guide 24 so as to make the capacity of the liquid discharging chamber 60 zero before absorbing the impact force. The free piston 61 moves apart from the end surface of the rod guide 24 at a degree corresponding to the capacity of the oil which the absorber valve 62 feeds from the rod side chamber 31 for absorbing the impact force (the capacity of the liquid discharging chamber 60 becomes the capacity of the oil). The free piston 61 returns all of the oil from the return valve 63 to the rod side chamber 31 after absorbing the impact force so as to contact with the end surface of the rod guide 24. Further, the free piston 61 returns the piston rod 22 and the piston 23 to the position before absorbing the impact force and coincides the return position of the propulsion unit main body 15 with the staying position before rising up.

In this case, the tilt device 20 has an operating valve 64 (a spring bearing 64A, a spring 64B and a spring holder 64C) in the piston 23. The operating valve 64 opens when the oil pressure in the piston side chamber 32 is increased to a level equal to or greater than a predetermined value. In such case the forward propelling force equal to or more than a predetermined value is applied under a condition of shipping over a shoal in which the propulsion unit main body 15 is kept at an optional middle tilt position. Accordingly, the piston rod 22 moves forward to the cylinder 21 so as to be compressed, and the propulsion unit main body 15 is in a down position and is in a normal shipping state.

A description will be given below of contents of the operation of the tilt device 20.

(A) Normal Shipping

A description will be given of a reverse lock state keeping the tilt device 20 in tilt down position shown in FIG. 5 during normal shipping. In this case, the operating portion 47 of the tilt operating apparatus 40 sets the switching valve 42 to a closed position, and the propulsion unit main body 15 abuts the front end portion of the swivel bracket 14 to the forward movement keeping portion of the clamp bracket 12, whereby the propulsion unit main body 15 is kept at the normal shipping position.

When setting the propulsion unit main body 15 to the normal shipping position and shipping forward, the forward movement propelling force is supported by the forward movement keeping portion of the damp bracket 12, and the tilt device 20 is held at the tilt down position. On the other hand, at a rearward shipping time, a tensile force is applied to the piston rod 22 due to the rearward movement propelling force and the pressure of the rod side chamber 31 is increased, however, the absorber valve 62 is not opened by a pressure increase of this degree, and the tilt device 20 is held at the tilt down position.

(B) Shipping Over Shoal

Figure 5:
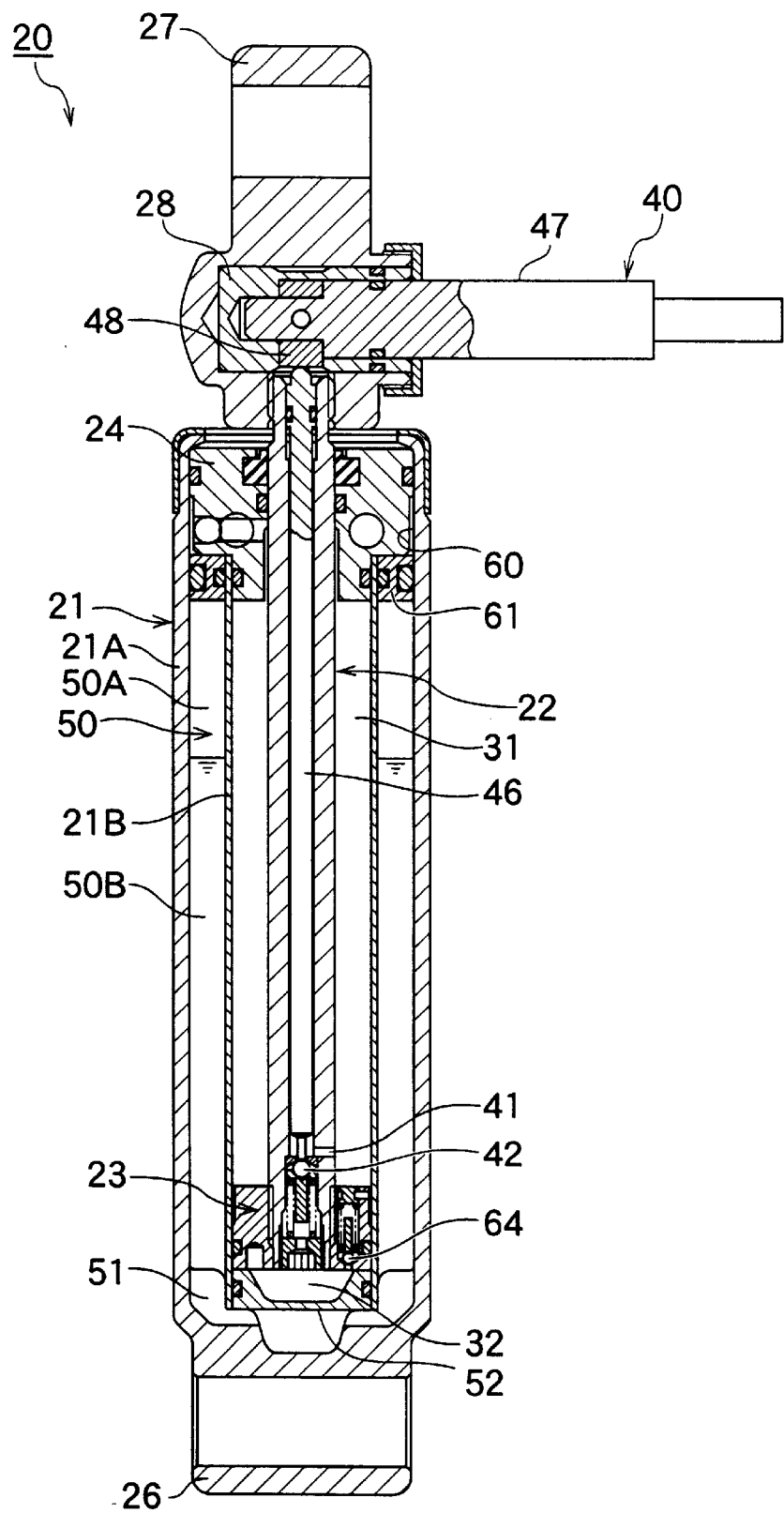
FIG. 5 is a cross sectional view showing a tilt down state.
Figure 6:
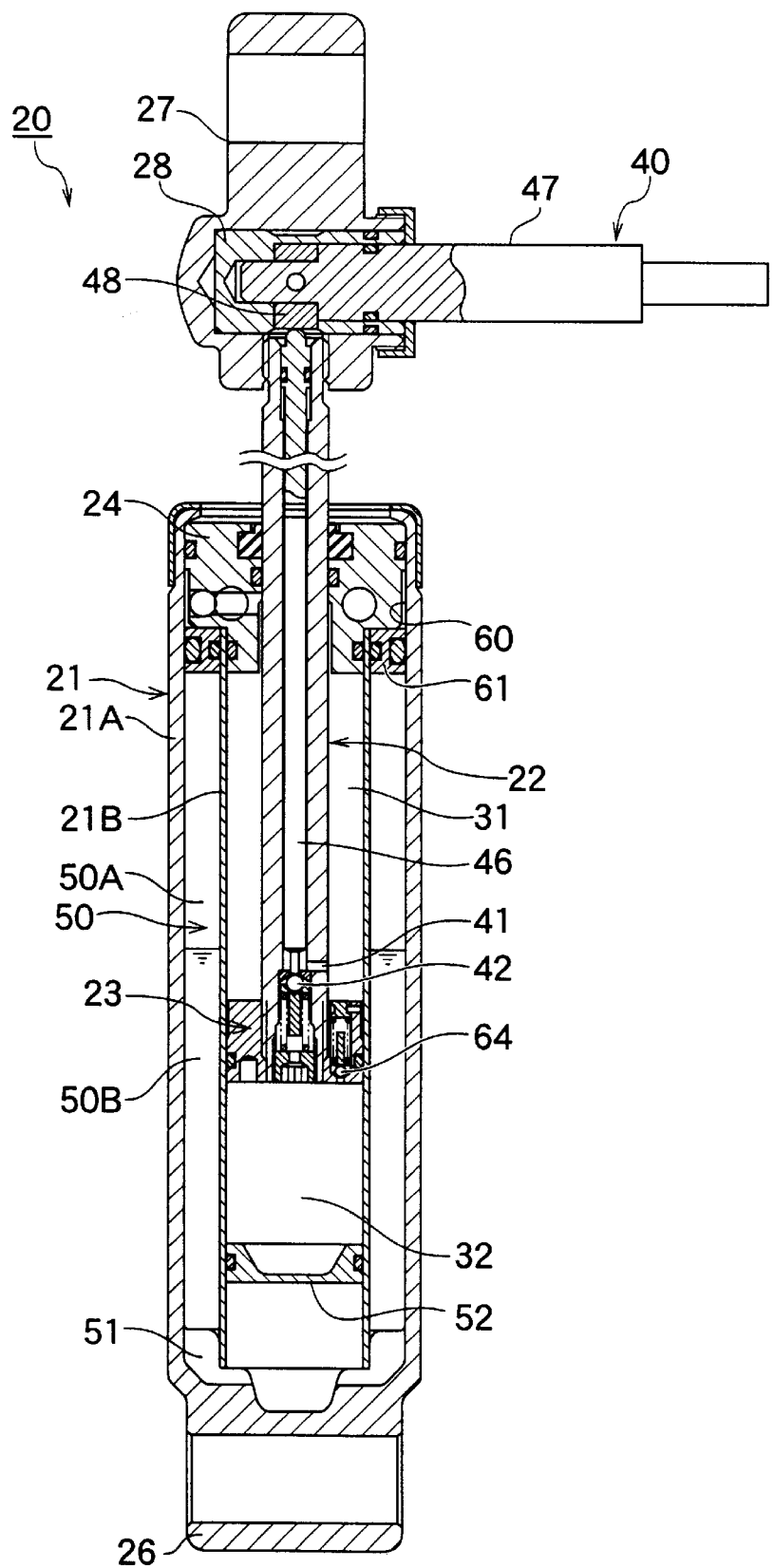
FIG. 6 is a cross sectional view showing a middle tilt state.
Figure 7:
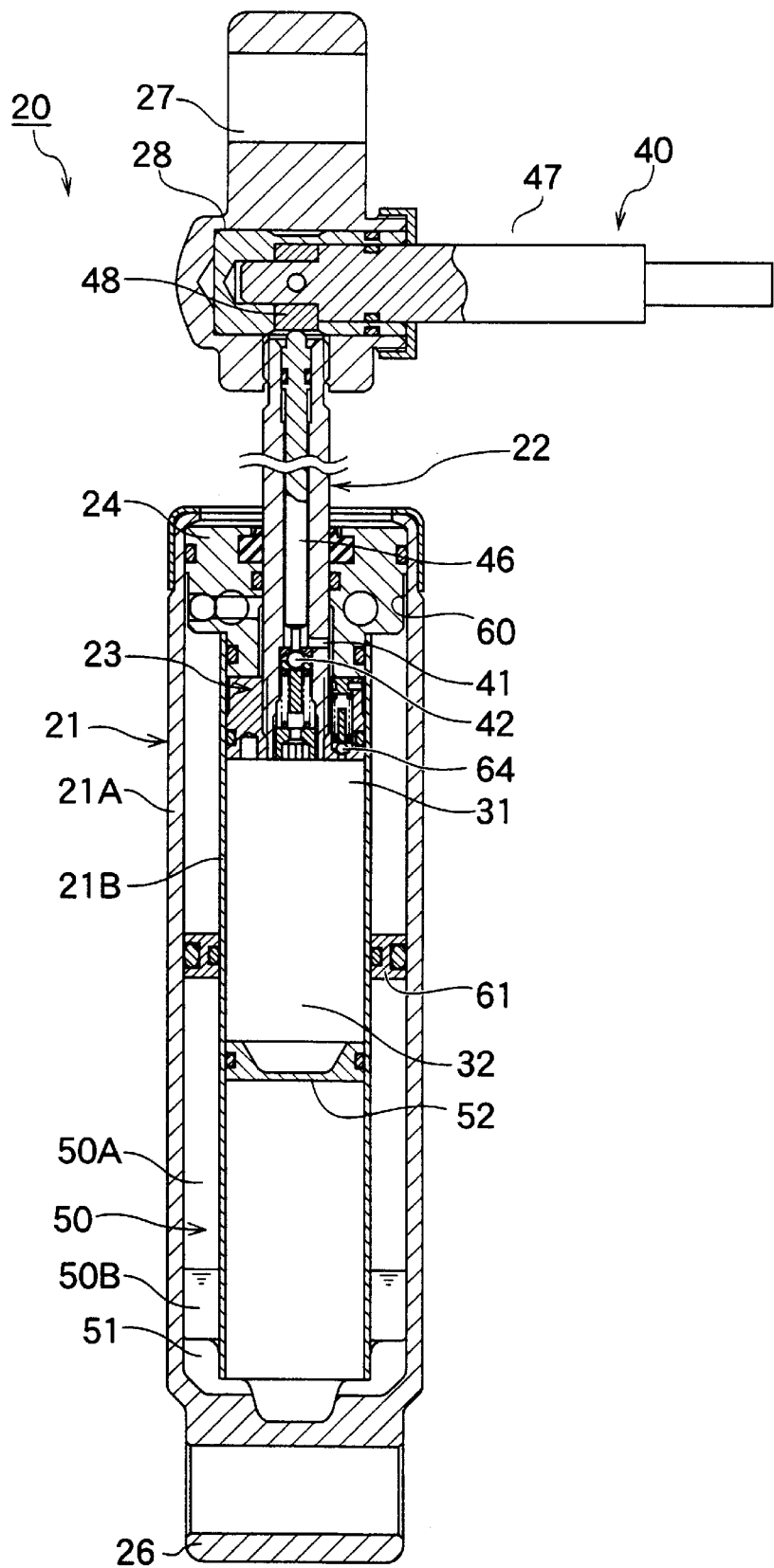
FIG. 7 is a cross sectional view showing a tilt up state.
Figure 8:
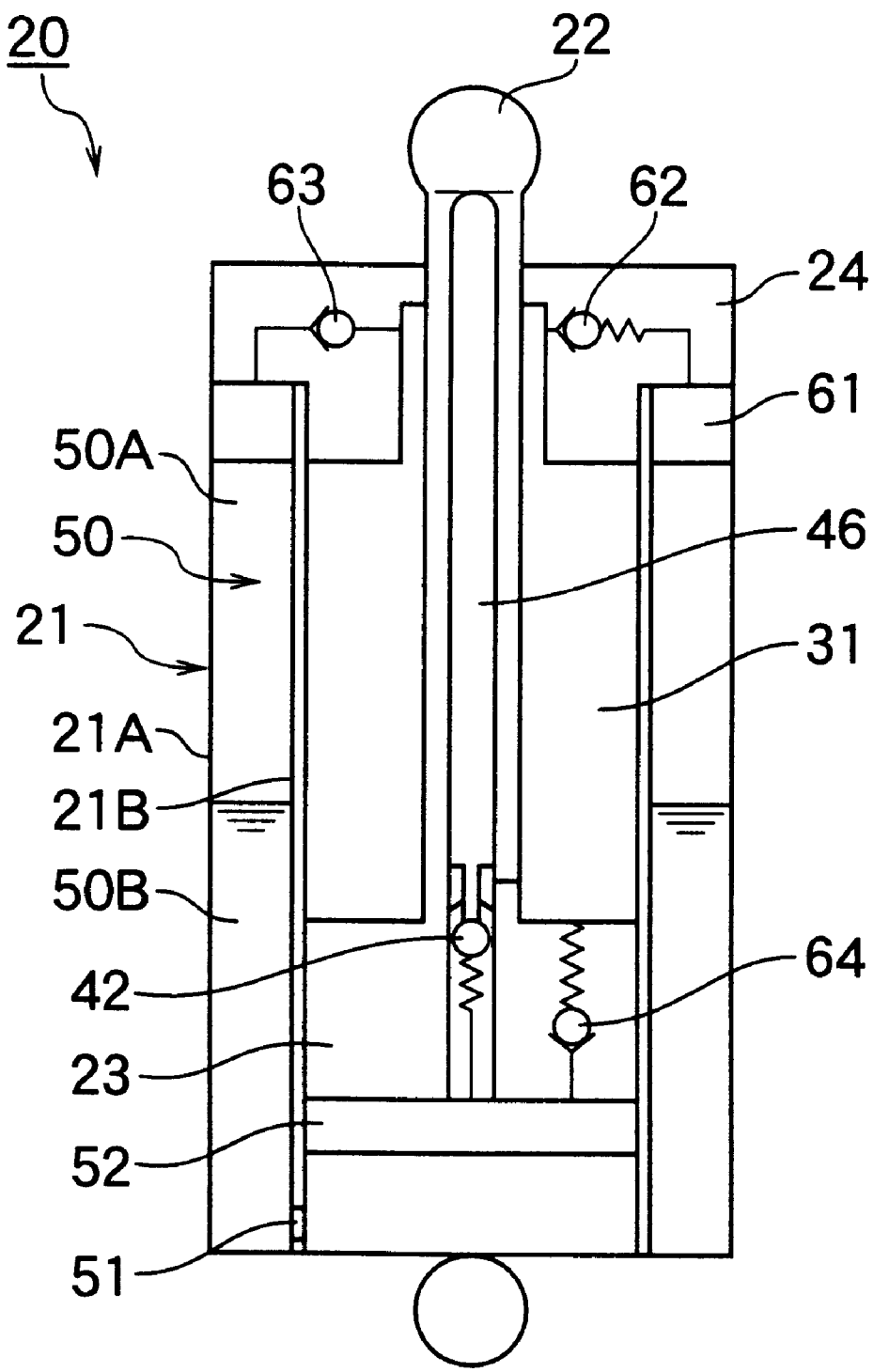
FIG. 8 is a schematic view showing a hydraulic circuit.
Figure 9:
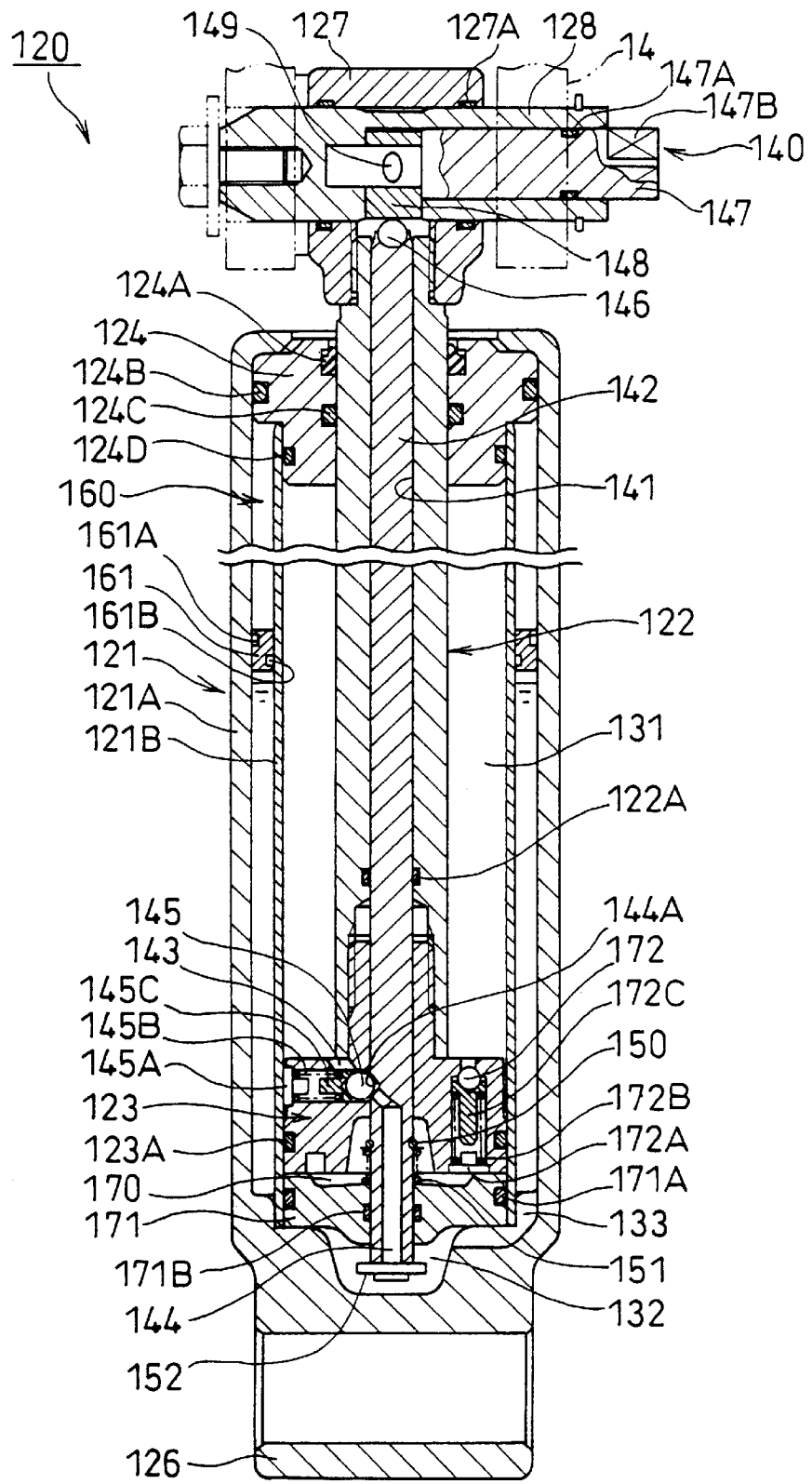
FIG. 9 is a cross sectional view of a main portion showing a tilt device in accordance with a second embodiment.

In shipping over the shoal, it is necessary to change the tilt device 20 from a tilt down position shown in FIG. 5 to a middle tilt position shown in FIG. 6 so as to prevent the propulsion unit main body 15 from hitting the bottom of the sea or river. In this case, the switching valve 42 is opened by the operating portion 47 of the tilt operating apparatus 40 in the manner mentioned above so as to communicate the rod side chamber 31 with the piston side chamber 32. Accordingly, the piston rod 22 and the piston 23 freely move in a vertical direction with respect to the cylinder 21. Therefore, it is possible to manually set the propulsion unit main body 15 to a desired middle tilt position. At this time, the gas pressure in the pressure accumulating chamber 50 assists the tilt-up load as mentioned above, whereby the tilt-up operation can be easily performed.

The piston rod 22 and the piston 23 are set in an unmovable tilt lock state with respect to the cylinder 21 by closing the switching valve 42 in accordance with the operating portion 47 of the tilt operating apparatus 40 in a state of setting the propulsion unit main body 15 to the middle tilt position so as to halt communication between the rod side chamber 31 and the piston side chamber 32. Accordingly, it is possible to ship over the shoal. In this case, when landing the hull, it is possible to set the propulsion unit main body 15 to the middle tilt position in the same manner as mentioned above.

In this case, in order to again position the propulsion unit main body 15 at the tilt-down position, the switching valve 42 is again opened by the operating portion 47 of the tilt operating apparatus 40 so that the propulsion unit main body 15 slowly returns to the tilt-down position due to the empty weight.

(C) Collision of Drifting Wood at Rearward Shipping Over Shoal

If an obstacle such as drifting wood or the like collides with the propulsion unit main body 15 and the force of impact is directed toward the front portion of the hull and applied to the lower portion of the propulsion unit main body 15 during rearward shipping over the shoal when setting the tilt device 20 to the middle tilt position shown in FIG. 6, the compressing force is applied to the piston rod 22, and the pressure of the oil in the piston side chamber 32 is increased. When the oil pressure reaches a level equal to or more than a predetermined value, the operating valve 64 provided in the piston 23 is opened to absorb the impact, the piston rod 22 enters into the cylinder 21 to be compressed, and the propulsion unit main body 15 is downed in a tilt-down direction.

(D) Change From Shipping Over Shoal to Normal Shipping

When setting the tilt device 20 to the middle tilt position as shown in FIG. 6 so as to ship over the shoal and thereafter ship offshore and change the propulsion unit main body 15 to the tilt-down position for the purpose of performing normal shipping, the forward propelling force of the propulsion unit main body 15 is increased. The propulsion unit main body 15 receives a force forward the hull due to the propelling force, so that a compressing force is applied to the piston rod 22 and the oil pressure of the piston side chamber 32 is increased. When the oil pressure reaches a level equal to or more than a predetermined value, the operating valve 64 in the piston 23 is opened, the piston rod 22 enters into the cylinder 21 so as to be compressed, and the propulsion unit main body 15 is positioned at the tilt-down position.

(E) Collision of Drifting Wood at Forward Shipping

If an obstacle such as drifting wood or the like collides with the propulsion unit main body 15 and an impact force directed toward the rear of the hull is applied to the lower portion of the propulsion unit main body 15 at a time of shipping forward in a state of setting the tilt device 20 to the tilt-down position shown in FIG. 5 or the middle tilt position shown in FIG. 6, the tensile force is applied to the piston rod 22, and the oil pressure in the rod side chamber 31 is increased. When the oil pressure reaches a level equal to or more than a predetermined value, the absorber valve 62 provided in the rod guide 24 opens to absorb the impact force, the piston rod 22 moves out of the cylinder 21 to expand, the tilt device 20 is upped to the tilt-up position shown in FIG. 7, and the propulsion unit main body 15 is raised up. At this time, the oil which the absorber valve 62 discharges from the rod side chamber 31 is fed to the liquid discharging chamber 60, and the free piston 61 moves apart from the end surface of the rod guide 24 at a degree corresponding to the capacity of the oil.

After the propulsion unit main body 15 is raised up, the pressure of the piston side chamber 32 is increased due to the empty weight of the tilted-up propulsion unit main body 15, and the pressure increases in the liquid discharging chamber 60 via the pressure accumulating chamber 50. When the pressure in the liquid discharging chamber 60 is increased to a level equal to or more than a predetermined value, the return valve 63 is opened so as to return the oil in the liquid pressure chamber 60 to the rod side chamber 31. Accordingly, when the free piston 61 is brought into contact with the end surface of the rod guide 24, the absorber valve 62 returns all of the oils fed to the liquid discharging chamber 60 due to the impact absorption to the rod side chamber 31. The tilt device 20 then returns to the position before absorbing the impact, and the propulsion unit main body 15 returns to the position before rising up.

In accordance with the present embodiment, the following effects can be obtained.

(1) Since the pressure accumulating chamber 50 is formed in the space between the outer cylinder 21A and the inner cylinder 21B in the cylinder 21, it is possible for the pressure accumulating chamber 50 to have a large capacity in a wide range longitudinal direction of the cylinder 21. The capacity of the pressure accumulating chamber 50 can be increased while the tilt device 20 is compact, whereby a gas assist performance can be improved.

(2) The free piston 52 corresponding to the liquid-gas separating means is interposed between the pressure accumulating chamber 50 and the piston side chamber 32. Because of this, the gas in the pressure accumulating chamber 50 does not feed to the piston side chamber 32 and further to the rod side chamber 31 through the switching valve 42 even when the tilt device 20 takes any mounting attitude such as a normal position or a reverse position. Accordingly, the pressure accumulating chamber 50 can maintain a sufficient gas capacity. No gas is mixed to the working fluid in the piston side chamber 32 and the rod side chamber 31, so it is possible to secure a stable gas assist function at a time of opening the switching valve 42 and secure a stable tilt-lock function at a time of closing the switching valve 42. That is, it is possible to secure an improved operability while keeping freedom in the mounting direction.

(3) The absorber valve 62 and the return valve 63 provided in the rod guide 24 have a diameter larger than that of the piston 23 in the complex cylinder type cylinder 21. Accordingly, since it is possible to receive the absorber valve 62 and the return valve 63 in the rod guide 24 with room without increasing the diameter of the rod guide 24 and it is possible to make the diameter of the piston 23 small, it is possible to raise up the propulsion unit main body 15 against the collision of drifting wood while making the cylinder 21 small-diameter and compact.

(4) In connection with the absorber valve 62 and the return valve 63 which are provided in the rod guide 24, the free piston 61 for coinciding the returning position after rising up of the propulsion unit main body 15 with the staying position before rising up is provided in the space between the outer cylinder 21A and the inner cylinder 21B in the cylinder 21. The liquid discharging chamber 60 for the fluid discharged from the absorber valve 62 is formed in the rod guide 24 side from the free piston 61 in the space. Accordingly, it is possible to coincide the returning position of the propulsion unit main body 15 raised up due to the collision of drifting wood with the staying position before being raised up.

(5) Since the switching valve 42 is provided in the piston rod 22 or the piston 23 and the operating portion 47 of the switching valve 42 is provided in the portion protruding from the cylinder 21 of the piston rod 22, it is possible to reduce a lateral size of the tilt device 20 and make the tilt device 20 compact.

(6) Since the absorber valve 62 and the return valve 63 in the items (3) and (4) are not provided in the piston rod 22 or the piston 23 but in the rod guide 24 at a time of providing the switching valve 42 in the piston rod 22, it is possible to easily place the switching valve 42 without increasing the diameter of the piston 23.

(Second Embodiment) (FIGS. 9 to 12)

A point at which a second embodiment is different from the first embodiment is that the propulsion unit main body 15 can be tilted by a tilt device 120 in place of the tilt device 20.

Figure 10:
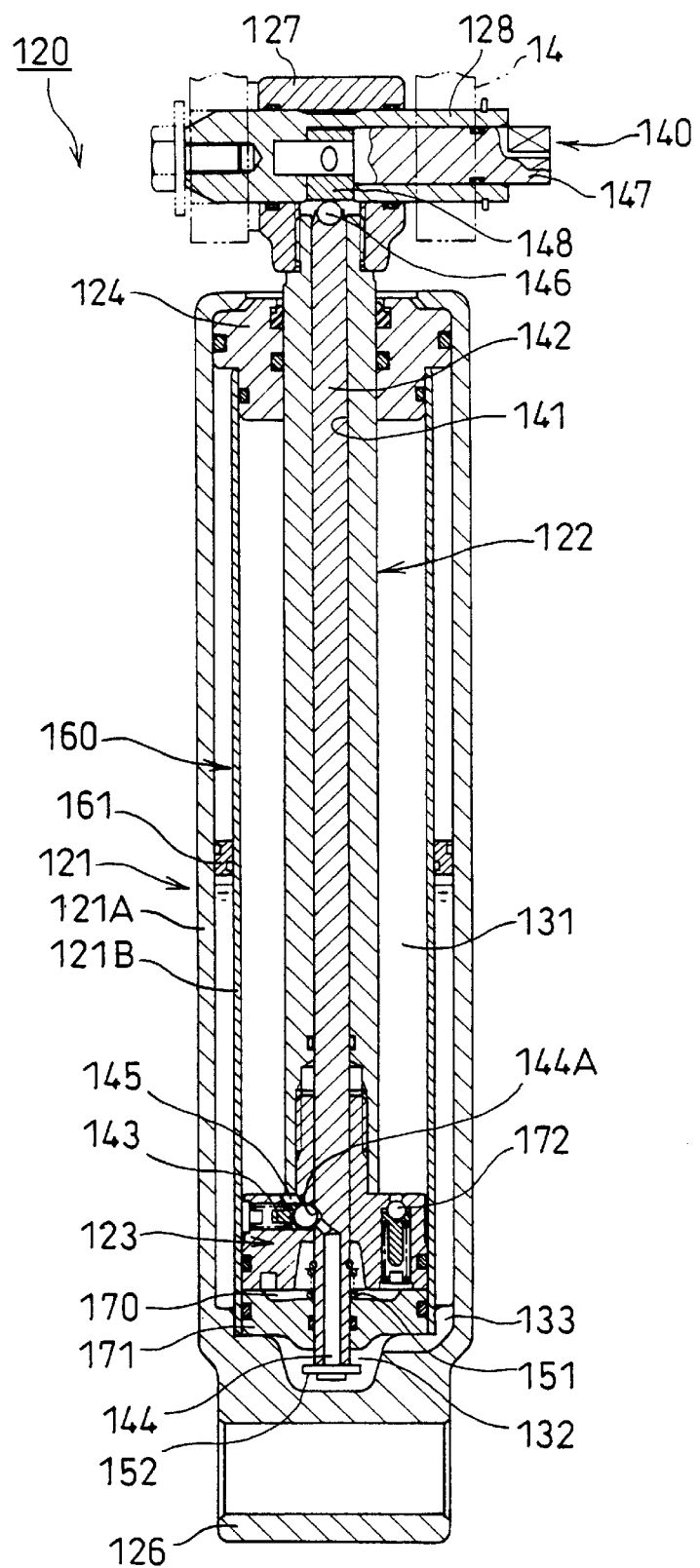
FIG. 10 is a cross sectional view showing a tilt down state.
Figure 11:
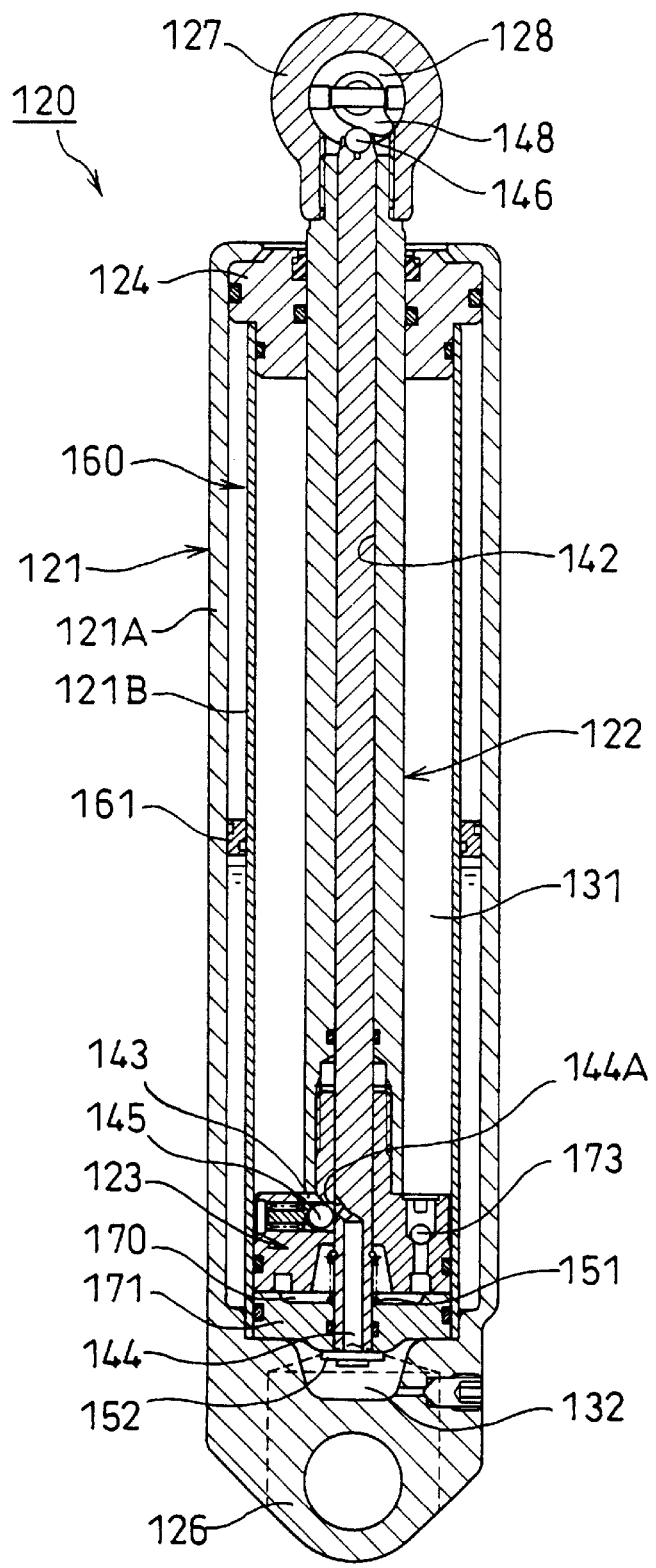
FIG. 11 is a cross sectional view showing a state of opening a switching valve in FIG. 10.
Figure 12:
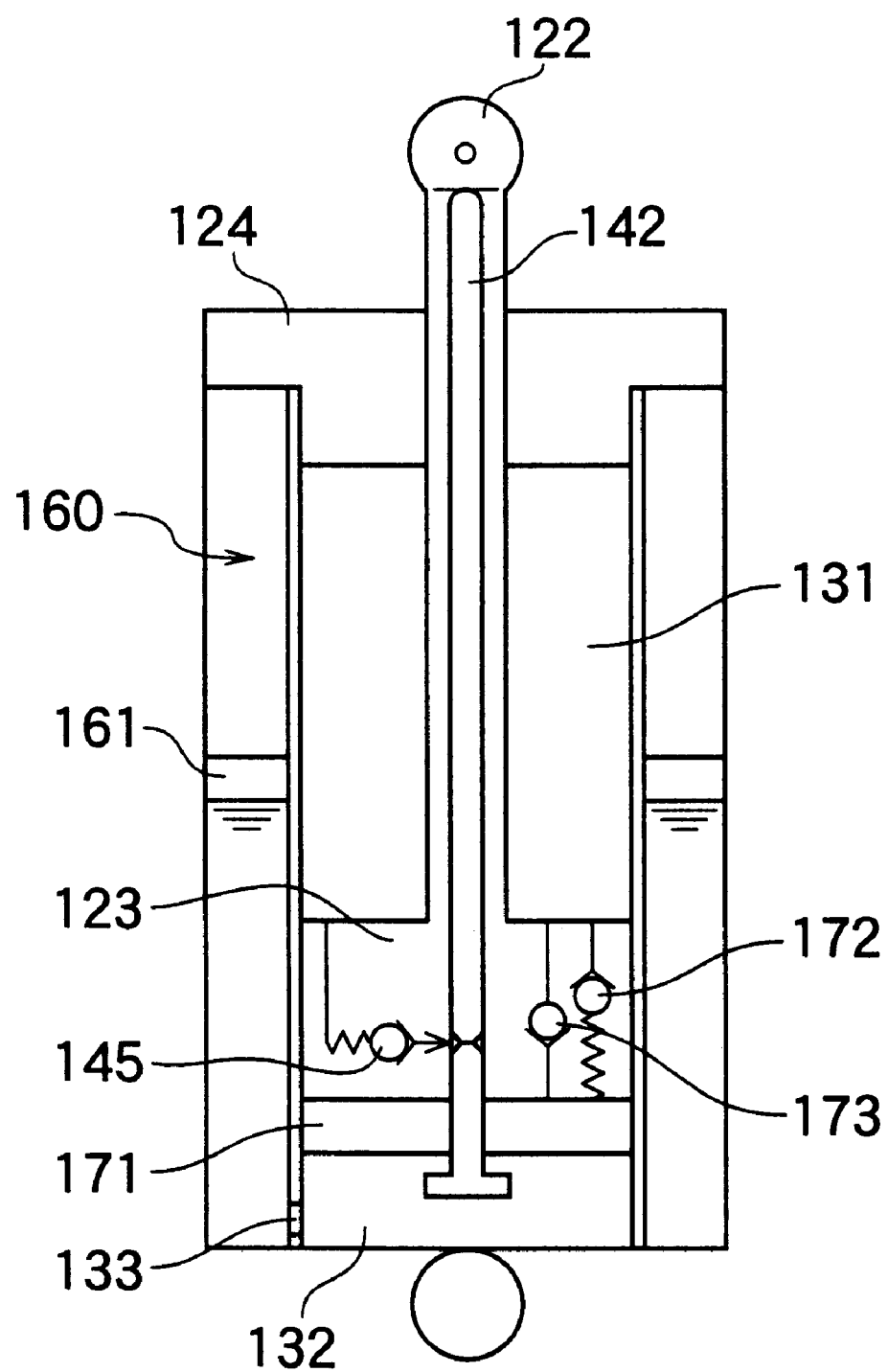
FIG. 12 is a schematic view showing a hydraulic circuit.

The tilt device 120 has, as shown in FIGS. 10 to 12, a cylinder 121 with a mounting portion 126 connected by a pin to the clamp bracket 12, a piston rod 122 with a mounting portion 127 connected by a pin to the clamp bracket 14, and a piston 123 fixed to an inserted end to the cylinder 121 of the piston rod 122. The cylinder 121 is constituted by a double pipe (a complex cylinder structure) having an outer cylinder 121A and an inner cylinder 121B and is structured such that the outer cylinder 121A and the inner cylinder 121B are sealed at an end portion of the cylinder 121 and a rod guide 124 for supporting the piston rod 122 is provided. That is, the structure is made such that the inner cylinder 121B and the rod guide 124 are held in an inner portion of the outer cylinder 121A by abutting one end portion of the inner cylinder 121B to a recess portion in a closed end of the casting outer cylinder 121A, fitting another end portion of the inner cylinder 121B to a small diameter portion at an inner end of the rod guide 124 fitted to an opening portion of the outer cylinder 121A and caulking and holding the rod guide 124 by an outer end portion of the outer cylinder 121A. Reference numeral 124A denotes an oil seal, and reference numerals 124B to 124D denote an O-ring.

The piston rod 122 and the piston 123 are received within the inner cylinder 121B of the cylinder 121, and the piston 123 defines a rod side chamber 131 in a side of receiving the piston rod 122 and a piston side chamber 132 in a side of not receiving the piston rod 122 in an inner portion of the inner cylinder 121B and receives an oil corresponding to a working fluid in the rod side chamber 131 and the piston side chamber 132. Reference numeral 123A denotes an O-ring. In accordance with the present embodiment, the portion between the bottom side of the outer cylinder 121A and the lower side portion of an annular space formed between the outer cylinder 121A and the inner cylinder 121B and connected to the bottom side space via a communicating passage 133, in an inner portion of the cylinder 121 is formed as a series of piston side chamber 132.

The tilt device 120 has a tilt operating apparatus 140 which makes it possible to tilt the propulsion unit main body 15 between a tilt down position and a tilt up position in accordance with a manual operation. The tilt operating apparatus 140 inserts a switching operation rod 142 to a hollow hole 141 extending through a total length of the piston rod 122 and the piston 123, pierces communicating passages 143 and 144 communicating the piston 123 and the switching operation rod 142 with each other, and communicates the rod side chamber 131 with the piston side chamber 132 by these communicating passages 143 and 144. Reference numeral 122A denotes an O-ring. A switching valve 145 (a spring bearing 145A, a spring 145B and a spring holder 145C) which can close communication between the communicating passage 143 and the communicating passage 144 is provided in the communicating passage 143 of the piston 123. A rolling ball 146 held at a base end of the switching operation rod 142 abuts to a cam 148 of an operating portion 147 provided in a connecting pin 128 to the swivel bracket 14 of the mounting portion 127 attached to the portion outward protruding from the cylinder 121 of the piston rod 122. Reference numerals 127A and 147A denote an O-ring and reference numeral 149 denotes a connecting pin. The switching operation rod 142 switches and sets a valve seat 144A formed in a conical hole shape and provided in a communicating portion between the communicating passage 143 and the communicating passage 144 to a closing operation position (a lower end position, FIG. 10) of the communicating passages 143 and 144 by the switching valve 145 and an opening operation position (an upper end position, FIG. 11) thereof by rotating the cam 148 of the operating portion 147, for example, at 45 degrees, by means of a handle attached to a handle engaging portion 147B of the operating portion 147, and brings the switching valve 145 into contact with the valve seat 144A or moves the switching valve 145 apart from the valve seat 144A against an elastic force of the spring 145B so as to open or close the communicating passages 143 and 144. In this case, the switching valve 145 is a check ball which has a diameter slightly smaller than a hole diameter of the communicating passage 143, and the switching operation rod 142 is prevented from being rotated by rotation preventing means (not shown).

In this case, in the tilt operating apparatus 140, the switching operation rod 142 passes through a free piston 171 provided onto a lower end surface of the piston 123 in a manner mentioned below to a side of the piston side chamber 132 as mentioned above, within the cylinder 121, and is provided with an engaging pin 152 engaged with a lower end surface of the free piston 171 at the through end. Further, the switching operation rod 142 interposes a spring 151 between a stopper ring 150 provided in the rod 142 and an upper end surface of the free piston 171, in a space portion between the piston 123 and the free piston 171. The spring 151 is backed up by the free piston 171 and always abuts the rolling ball 146 of the switching operation rod 142 to the cam 148. When the piston rod 122 and the piston 123 leave the free piston 171 and tilt up in the manner mentioned above due to the collision of drifting wood or the like, the stopper ring 150 engages the switching operation rod 142 with the free piston 171 so as to leave together with the free piston 171 in the inner portion of the cylinder 121. Piston rod 122 is separated from the switching operation rod 142 so as to greatly tilt up with respect to the cylinder 121.

The tilt device 120 has a pressure accumulating chamber 160 capable of applying a gas pressure to the piston side chamber 132, for the purpose of assisting a tilt-up load applied to the propulsion unit main body 15 at a time of communicating the rod side chamber 131 with the piston side chamber 132. This occurs in accordance with an opening operation of the switching valve 145 of the tilt operating apparatus 140 so as to manually tilt the propulsion unit main body 15. In the present embodiment, an upper portion of an annular space between the outer cylinder 121A and the inner cylinder 121B and in an inner portion of the cylinder 121 forms a pressure accumulating chamber 160, and a free piston 161 constituting gas-liquid separating means is arranged between the pressure accumulating chamber 160 and the piston side chamber 132 in the inner portion of the annular space. Reference numerals 161A and 161B denote an O-ring. That is, the pressure accumulating chamber 160 applies a gas pressure at a time of opening the switching valve 145 of the tilt operating apparatus 140 to both sides of the piston 123 via the working fluid, and reduces the tilt-up load by an assist force obtained by multiplying a cross sectional area of the piston rod 122 by the gas pressure, the cross sectional area corresponding to a difference between both side pressure receiving areas of the piston 123. Further, the pressure accumulating chamber 160 compensates a capacity change of the rod side chamber 131 and the piston side chamber 132 caused by the forward and rearward movements of the piston rod 122 with respect to the rod side chamber 131 and the piston side chamber 132 of the cylinder 121, on the basis of expansion and compression of the pressure accumulating chamber 160 (upward and downward movements of the free piston 161).

The tilt device 120 has the following structure in order to secure a rising up performance of the propulsion unit main body 15 due to collision of the obstacle such as drifting wood or the like. In accordance with the present embodiment, the structure is made such that the free piston 171 is brought into contact with the end surface of the piston 123 and in the inner portion of the inner cylinder 121B of the cylinder 121, an opposite side of the piston 123 with respect to the free piston 171 forms the piston side chamber 132, and a side of the piston 123 forms a liquid discharging chamber 170. The switching operation rod 142 mentioned above passes through a center portion of the free piston 171. Reference numerals 171A and 171B denote an O-ring. Further, an absorber valve 172 (a spring bearing 172A, a spring 172B and a spring holder 172C) and a return valve 173 are provided in the piston 123. The absorber valve 172 can be opened at a time when the oil in the rod side chamber 131 is increased to a level equal to or more than a predetermined value such as under application of an impact force generated by collision with the obstacle such as drifting wood or the like. The return valve 173 can feed the oil in the rod side chamber 131 to the liquid discharging chamber 170, and can extend the piston rod 122 and the piston 123 so as to raise the propulsion unit main body 15 up. The return valve 173 can be opened when the oil in the liquid discharging chamber 170 is increased to a level equal to or more than a predetermined value under application of an empty weight of the propulsion unit main body 15 tilted up after absorbing the impact force generated by the collision with the obstacle, can return the oil in the liquid discharging chamber 170 to the rod side chamber 131, and can compress the piston rod 122 and the piston 123 so as to return the propulsion unit main body 15 to a position before being raised up. The piston 123 is brought into contact with the end surface of the free piston 171 so as to make a capacity of the liquid discharging chamber 170 zero before absorbing the impact force. The piston 123 moves apart from the end surface of the free piston 171 at a degree corresponding to the capacity of the oil which the absorber valve 172 feeds from the rod side chamber 131 for absorbing the impact force (the capacity of the liquid discharging chamber 170 becomes the capacity of the oil). The piston 123 returns all of the oil from the return valve 173 to the rod side chamber 131 after absorbing the impact force so as to be brought into contact with the end surface of the free piston 171, so that the piston 123 returns the piston rod 122 and the piston 123 to the position before absorbing the impact force and coincides the return position of the propulsion unit main body 15 with the staying position before being raised up.

In this case, the tilt device 120 commonly uses the switching valve 145 of the tilt operating apparatus 140 as an operating valve. In the case that the switching valve 145 functioning as the operating valve is set at the closed operating position, the switching valve 145 is opened when the oil pressure in the piston side chamber 132 is increased to a level equal to or more than a predetermined value, such as a case that a forward propelling force equal to or more than a predetermined value is applied under a condition of shipping over a shoal in which the propulsion unit main body 15 is kept at an optional middle tilt position. Accordingly, the piston rod 122 moves forward to the cylinder 121 so as to be compressed, and the propulsion unit main body 15 is downed to a down position and becomes a normal shipping state.

A description will be given below of contents of the operation of the tilt device 120.

(A) Normal Shipping

A description will be given of a reverse lock state keeping the tilt device 120 at a tilt down position shown in FIG. 10 at a normal shipping time. In this case, the operating portion 147 of the tilt operating apparatus 140 sets the switching valve 145 to a closed position, and the propulsion unit main body 15 abuts the front end portion of the swivel bracket 14 to the forward movement keeping portion of the clamp bracket 12, whereby the propulsion unit main body 15 is kept at the normal shipping position.

In the case of setting the propulsion unit main body 15 to the normal shipping position and shipping forward, the forward movement propelling force is supported by the forward movement keeping portion of the clamp bracket 12, and the tilt device 120 is held at the tilt down position. On the other hand, at a rearward shipping time, a tensile force is applied to the piston rod 122 due to the rearward movement propelling force and the pressure of the rod side chamber 131 is increased. However, the absorber valve 172 is not opened by the pressure increased of this degree, and the tilt device 120 is held at the tilt down position.

(B) Shipping Over Shoal

In shipping over the shoal, it is necessary to change the tilt device 120 from a tilt down position to a middle tilt position so as to prevent the propulsion unit main body 15 from coming into contact with the bottom of the sea or river. In this case, the switching valve 145 is opened by the operating portion 147 of the tilt operating apparatus 140 in the manner mentioned above so as to communicate the rod side chamber 131 with the piston side chamber 132. Accordingly, the piston rod 122 and the piston 123 freely move in a vertical direction with respect to the cylinder 121. Therefore, it is possible to manually set the propulsion unit main body 15 to a desired middle tilt position. At this time, the gas pressure in the pressure accumulating chamber 160 assists the tilt-up load as mentioned above, whereby the tilt-up operation can be easily performed.

The piston rod 122 and the piston 123 are in a tilt lock state being unmovable with respect to the cylinder 121 by closing the switching valve 145 in accordance with the operating portion 147 of the tilt operating apparatus 140 in a state of setting the propulsion unit main body 15 to the middle tilt position so as to make the rod side chamber 131 not communicated with the piston side chamber 132. Accordingly, it is possible to ship over the shoal. In this case, when landing the hull, it is possible to set the propulsion unit main body 15 to the middle tilt position in the same manner as mentioned above.

In this case, in order to again position the propulsion unit main body 15 at the tilt-down position, the propulsion unit main body 15 slowly returns to the tilt-down position due to the empty weight if the switching valve 145 is again opened by the operating portion 147 of the tilt operating apparatus 140.

(C) Collision of Drifting Wood at Rearward Shipping Over Shoal

If an obstacle such as drifting wood or the like collides with the propulsion unit main body 15 and an impact force directed to a front portion of the hull is applied to the lower portion of the propulsion unit main body 15 during rearward shipping over the shoal in a state of setting the tilt device 120 to the middle tilt position, the compressing force is applied to the piston rod 122, and oil pressure in the piston side chamber 132 is increased. When the oil pressure reaches a level equal to or more than a predetermined value, the switching valve 145 functioning as the operating valve is opened so as to absorb the impact, the piston rod 122 enters into the cylinder 121 so as to be compressed, and the propulsion unit main body 15 is downed in a tilt-down direction.

(D) Change From Shipping Over Shoal to Normal Shipping

In the case of setting the tilt device 120 to the middle tilt position so as to ship over the shoal and thereafter ship offshore and change the propulsion unit main body 15 to the tilt-down position to perform a normal shipping, the forward propulsion force of the propulsion unit main body 15 is increased. The propulsion unit main body 15 is applied a force forward the hull due to the propelling force, so that a compressing force is applied to the piston rod 122 and the pressure of the oil in the piston side chamber 132 is increased. When the oil pressure reaches a level equal to or more than a predetermined value, the switching valve 145 serving as the operating valve is opened, the piston rod 122 enters into the cylinder 121 so as to be compressed, and the propulsion unit main body 15 is set to the tilt-down position.

(E) Collision of Drifting Wood at Forward Shipping

If an obstacle such as drifting wood or the like collides with the propulsion unit main body 15 and an impact force directed rear of the hull is applied to the lower portion of the propulsion unit main body 15 when shipping forward with the tilt device 120 set to the tilt-down position or the middle tilt position, the tensile force is applied to the piston rod 122, and the pressure of the oil in the piston side chamber 131 is increased. When the oil pressure reaches a level equal to or more than a predetermined value, the absorber valve 172 is opened to absorb the impact force, the piston rod 122 moves out of the cylinder 121 so as to be expanded, and the propulsion unit main body 15 is raised up. At this time, the oil which the absorber valve 172 discharges from the rod side chamber 131 is fed to the liquid discharging chamber 170, and the piston 123 moves apart from the end surface of the free piston 171 at a degree corresponding to the capacity of the oil.

After the propulsion unit main body 15 is raised up, the pressure of the liquid discharging chamber 170 is increased due to the empty weight of the tilted-up propulsion unit main body 15. When the pressure in the liquid discharging chamber 170 is increased to a level equal to or more than a predetermined value, the return valve 173 is opened so as to return the oil in the liquid pressure chamber 170 to the rod side chamber 131. Accordingly, when the piston 123 is brought into contact with the end surface of the free piston 171, the absorber valve 172 returns all of the oils fed to the liquid discharging chamber 170 due to the impact absorption to the rod side chamber 131, so that the tilt device 120 returns to the position before absorbing the impact, and the propulsion unit main body 15 returns to the position before being raised up.

In accordance with the present embodiment, the following effects can be obtained.

(1) Since the pressure accumulating chamber 160 is formed in the space between the outer cylinder 121A and the inner cylinder 121B in the cylinder 121, it is possible to form the pressure accumulating chamber 160 having a large capacity in a wide range in a longitudinal direction of the cylinder 121, and increase the capacity of the pressure accumulating chamber 160 while the tilt device is compact, whereby gas assist performance can be improved.

(2) Since the free piston 161 corresponding to the liquid-gas separating means is interposed between the pressure accumulating chamber 160 and the piston side chamber 132, the gas in the pressure accumulating chamber 160 does not feed to the piston side chamber 132 and further to the rod side chamber 131 through the switching valve 145 even when the tilt device 120 takes any mounting attitude such as a normal position or a reverse position. Accordingly, the pressure accumulating chamber 160 can maintain a sufficient gas capacity, no gas is mixed to the working fluid in the piston side chamber 132 and the rod side chamber 131, and it is possible to secure a stable gas assist function at a time of opening the switching valve 145 and secure a stable tilt-lock function at a time of closing the switching valve 145. That is, it is possible to secure an improved operability and maintain freedom in the mounting direction.

(3) Since the switching valve 145 is provided in the piston rod 122 or the piston 123 and the operating portion 147 of the switching valve 145 is provided in the portion protruding from the cylinder 121 of the piston rod 122, it is possible to reduce the lateral size of the tilt device 120 and make the tilt device 120 compact.

As heretofore explained, embodiments of the present invention have been described in detail with reference to the drawings. However, the specific configurations of the present invention are not limited to the embodiments but those having a modification of the design within the range of the present invention are also included in the present invention.

As mentioned above, in accordance with the present invention, in the tilt device for the marine propulsion unit provided with the gas assisting function, the capacity of the pressure accumulating chamber can be increased while maintaining a compact size, and it is possible to secure an improved operability while keeping a freedom in the mounting direction.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A tilt device for a marine propulsion unit comprising:

a cylinder connected to one of a hull and a main body of a propulsion unit which is arranged and constructed to receive a working fluid;

a piston rod connected to another and inserted into the cylinder so as to freely compress and expand;

a piston connected to an inserted end to the cylinder of the piston rod, and defining a rod side chamber in a piston rod receiving side within the cylinder and a piston side chamber in a side which does not receive a piston rod within the cylinder.

a switching valve capable of communicating the rod side chamber with the piston side chamber; and a pressure accumulating chamber capable of applying a gas pressure to the piston side chamber, wherein the cylinder has a double pipe having an outer cylinder and an inner cylinder, the piston rod and the piston are received in the inner cylinder, the pressure accumulating chamber is formed in a space between the outer cylinder and the inner cylinder, and gas-liquid separating means is arranged between the pressure accumulating chamber and the piston side chamber.

2. A tilt device for a marine propulsion unit as claimed in claim 1, wherein said switching valve is provided in the piston rod or the piston, a switching operation rod operating said switching valve is installed in the piston rod, and an operating portion of said switching operation rod is provided in a portion protruding from the cylinder of the piston rod.

3. A tilt device for a marine propulsion unit as claimed in claim 1, wherein said gas-liquid separating means is a free piston arranged between the pressure accumulating chamber and the piston side chamber and within the inner cylinder.

4. A tilt device for a marine propulsion unit as claimed in claim 2, wherein said gas-liquid separating means is a free piston arranged between the pressure accumulating chamber and the piston side chamber and within the inner cylinder.

5. A tilt device for a marine propulsion unit as claimed in claim 1, wherein said gas-liquid separating means is a free piston arranged between the pressure accumulating chamber and the piston side chamber and in an annular space between the outer cylinder and the inner cylinder.

6. A tilt device for a marine propulsion unit as claimed in claim 2, wherein said gas-liquid separating means is a free piston arranged between the pressure accumulating chamber and the piston side chamber and in an annular space between the outer cylinder and the inner cylinder.

7. A tilt device for a marine propulsion unit as claimed in claim 1, wherein a communicating passage communicating the piston side chamber with the rod side chamber is provided in an inserted end side to the inner cylinder of said piston rod, and said switching valve is provided in the communicating passage.

8. A tilt device for a marine propulsion unit as claimed in claim 2, wherein a communicating passage communicating the piston side chamber with the rod side chamber is provided in an inserted end side to the inner cylinder of said piston rod, and said switching valve is provided in the communicating passage.

* * * * *